US012269380B2

(12) United States Patent
Cui

(10) Patent No.: US 12,269,380 B2
(45) Date of Patent: Apr. 8, 2025

(54) MISUSE PREVENTING MECHANISM AND ROTATABLE CHILD SAFETY SEAT

(71) Applicant: Wonderland Switzerland AG, Steinhausen (CH)

(72) Inventor: Zong-Wang Cui, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 338 days.

(21) Appl. No.: 17/777,049

(22) PCT Filed: Nov. 13, 2020

(86) PCT No.: PCT/EP2020/082084
§ 371 (c)(1),
(2) Date: May 15, 2022

(87) PCT Pub. No.: WO2021/094553
PCT Pub. Date: May 20, 2021

(65) Prior Publication Data
US 2022/0402412 A1 Dec. 22, 2022

(30) Foreign Application Priority Data
Nov. 15, 2019 (CN) .......................... 201921983403.7

(51) Int. Cl.
*B60N 2/28* (2006.01)
(52) U.S. Cl.
CPC .................................. *B60N 2/2869* (2013.01)
(58) Field of Classification Search
CPC .................................................... B60N 2/2869
See application file for complete search history.

(56) References Cited

U.S. PATENT DOCUMENTS

| | | | | |
|---|---|---|---|---|
| 2008/0252122 A1* | 10/2008 | Vallentin | .............. | B60N 2/2869 297/256.12 |
| 2009/0091167 A1* | 4/2009 | Jha | ........................ | B60N 2/2869 297/256.12 |
| 2016/0039319 A1* | 2/2016 | Zhang | .................. | B60N 2/2887 297/216.11 |

FOREIGN PATENT DOCUMENTS

| | | | |
|---|---|---|---|
| CN | 104627037 B | 1/2017 | |
| CN | 207523495 U | 6/2018 | |
| CN | 207809120 U | 9/2018 | |
| FR | 2 978 388 A1 | 2/2013 | |
| JP | 2005067593 A * | 3/2005 | ........... B60N 2/2869 |
| WO | 2012/146761 A1 | 11/2012 | |

OTHER PUBLICATIONS

"International Search Report" mailed on Feb. 17, 2021 for International application No. PCT/EP2020/082084, International filing date:Nov. 13, 2020.

* cited by examiner

*Primary Examiner* — Anthony D Barfield
(74) *Attorney, Agent, or Firm* — Volpe Koenig

(57) ABSTRACT

A misuse preventing mechanism (1) is disposed on a rotatable child safety seat (100). The rotatable child safety seat has a base (13) and an installation bracket (3) coupled to the base (13) and configured to support a carrier body (2). The installation bracket (3) is capable of rotating with respect to the base (13) and has a restraining groove (31). The misuse preventing mechanism (1) includes a lock member (11) disposed on the base (13) and driven to restrain a rotation angle of the carrier body (2).

12 Claims, 4 Drawing Sheets

MISUSE PREVENTING MECHANISM AND ROTATABLE CHILD SAFETY SEAT

FIELD OF THE INVENTION

The present invention relates to a baby product, particularly a misuse preventing mechanism and a rotatable child safety seat.

BACKGROUND OF THE INVENTION

As society develops continuously, more and more families have their own cars, and there are more and more opportunities for children to travel by car with their parents. Because children have weak ability of self-protection, children in a car often suffer more injuries than adults in accidents. In response to this situation, various child safety seats have appeared on the market. These child safety seats can be fixed to a common car seat for use, such that the children in the car can have a comfortable feeling with safety.

A conventional child safety seat generally includes a carrier body, a base, and an installation bracket. The carrier body is fixed to the base and the base can rotate with respect to the installation bracket, such that the carrier body can rotate with respect to the installation bracket. The carrier body may be used forward or backward by adjusting rotation with respect to the installation bracket. For safety, children under two years of age generally need to be seated opposite to the moving direction of the car (i.e. backward use). Generally, children over two years of age can be selectively seated toward or opposite to the moving direction of the car (i.e. forward or backward use) by rotation. In order to avoid incorrect adjustment by parents, a misuse preventing structure is generally disposed between the carrier body and the installation bracket. However, the structure of the conventional misuse preventing structure is complicated and cannot satisfy the requirement of production.

Therefore, a misuse preventing mechanism is needed to overcome the aforesaid defects.

SUMMARY OF THE INVENTION

The present invention aims at providing a misuse preventing mechanism that is safe, has simple structure, and can avoid incorrect adjustment.

The present invention further aims at providing a rotatable child safety seat that is safe, has simple structure, and can avoid incorrect adjustment.

This is achieved by a misuse preventing mechanism according to claim 1 and a rotatable child safety seat according to claim 11. The dependent claims pertain to corresponding further developments and improvements.

As will be seen more clearly from the detailed description following below, the claimed misuse preventing mechanism disposed on a rotatable child safety seat. The rotatable child safety seat has a base and an installation bracket coupled to the base and configured to support a carrier body. The installation bracket is capable of rotating with respect to the base and has a restraining groove. The misuse preventing mechanism includes a lock member disposed on the base and driven to restrain a rotation angle of the carrier body.

Compared to the prior art, the misuse preventing mechanism of the invention is equipped with the lock member and the restraining groove is correspondingly formed on the installation bracket for restraining the rotation angle of the carrier body. The lock member can be driven to extend into the restraining groove, such that the rotation angle of the carrier body with respect to the installation bracket is restrained. Accordingly, under the cooperation between the lock member and the restraining groove, the carrier body can only rotate with respect to the installation bracket within a specific rotation range, so as to prevent a user from incorrectly adjusting the angle of the carrier body with respect to the installation bracket. Accordingly, the invention can achieve the purpose of protecting the safety of children and then satisfy the use requirement for younger children. On the other hand, the lock member can be driven to eject from the restraining groove to allow the carrier body to randomly adjust the rotation angle with respect to the installation bracket, so as to satisfy the use requirement for older children. The misuse preventing mechanism of the invention has the advantages of safety and simple structure.

Preferably, the restraining groove has a first end and a second end. When the lock member is driven to extend into the restraining groove, the rotation angle of the carrier body is restrained within an angle included between the first end and the second end of the restraining groove.

Preferably, the misuse preventing mechanism further includes a driving assembly disposed on the base. The driving assembly drives the lock member to extend into the restraining groove. The rotation angle of the carrier body with respect to the installation bracket is restrained by an interference of the lock member within the restraining groove. The driving assembly drives the lock member to eject from the restraining groove to allow the carrier body to randomly adjust the rotation angle with respect to the installation bracket.

Preferably, the driving assembly includes an operating member, a linkage member, and a guiding pillar. An end of the linkage member is pivotally connected to the operating member and another end of the linkage member is pivotally connected to the lock member. The lock member has a first guiding hole. A middle portion of the linkage member has a second guiding hole. The guiding pillar is fixed on the base. The guiding pillar is inserted into the first guiding hole and the second guiding hole. The operating member is operated to cause the linkage member to swing under guidance of the guiding pillar and drive the lock member to extend into or eject from the restraining groove under guidance of the guiding pillar.

Specifically, the operating member is disposed on an outer surface of the base. The linkage member and the lock member are disposed in the base. The base has a third guiding hole. The linkage member is pivotally connected to the operating member through the third guiding hole. A pivot joint between the linkage member and the operating member slides along the third guiding hole.

Preferably, the third guiding hole is an arc hole and a center of the arc hole corresponds to the guiding pillar.

Preferably, the operating member is a knob.

Preferably, the first guiding hole is a longitudinal hole.

Preferably, the second guiding hole is an arc hole and a center of the arc hole corresponds to a pivot joint between the linkage member and the operating member.

Preferably, the base has an extension hole and the lock member extends into or ejects from the restraining groove through the extension hole.

Preferably, the misuse preventing mechanism further includes an elastic member and the elastic member provides an elastic force for extending the lock member into the restraining groove.

Preferably, the misuse preventing mechanism further includes an elastic member and the elastic member provides an elastic force for ejecting the lock member from the restraining groove.

As will be seen more clearly from the detailed description following below, the claimed rotatable child safety seat includes a carrier body, a base, an installation bracket capable of supporting the carrier body and rotating with respect to the base, and the aforesaid misuse preventing mechanism. The misuse preventing mechanism is disposed between the carrier body and the installation bracket. A rotation range of the carrier body with respect to the installation bracket is adjusted by the misuse preventing mechanism.

BRIEF DESCRIPTION OF THE DRAWINGS

In the following, the invention is further illustrated by way of example, taking reference to the accompanying drawings thereof.

DETAILED DESCRIPTION

Figure 1:
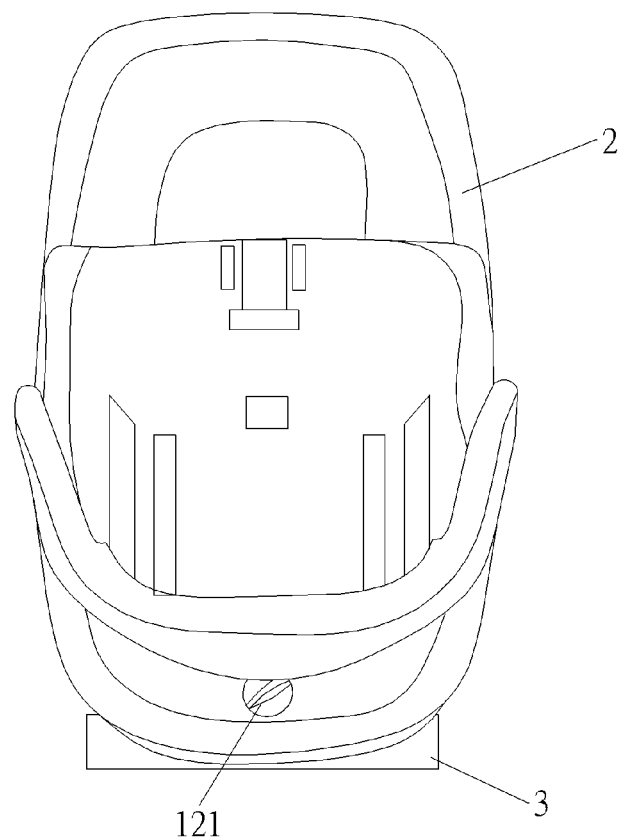
FIG. 1 is a schematic view illustrating the structure of a rotatable child safety seat of the invention.
Figure 2:
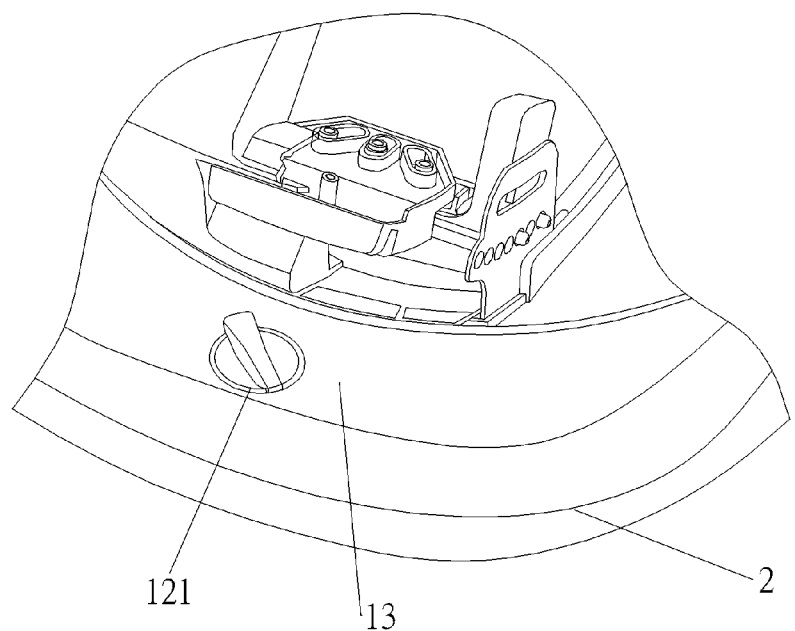
FIG. 2 is a schematic view illustrating the structure of parts of a rotatable child safety seat of the invention.
Figure 3:
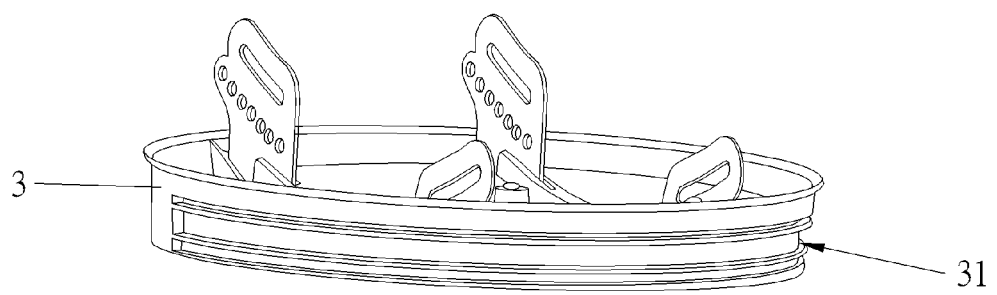
FIG. 3 is a schematic view illustrating the structure of an installation bracket of a rotatable child safety seat of the invention.

In order to explain the disclosure, structural features, and achieved effects in detail, the invention will be further described with the embodiments and drawings in the following.

Referring to FIGS. 1 to 5, the invention provides a misuse preventing mechanism 1 disposed between a base 13 and an installation bracket 3 capable of rotating with respect to the base 13. The misuse preventing mechanism 1 includes a lock member 11 and a driving assembly 12. The installation bracket 3 is coupled to the base 13 and configured to support a carrier body 2. The base 13 is installed on a bottom of the carrier body 2. The base 13 has an extension hole 131. The lock member 11 and the driving assembly 12 are disposed on the base 13. The installation bracket 3 has a restraining groove 31 configured to restrain a rotation angle of the carrier body 2. The restraining groove 31 is arranged along the periphery of the installation bracket 3 and a radian of the restraining groove 31 is smaller than 360 degrees. The driving assembly 12 drives the lock member 11 to extend into the restraining groove 31. The restraining groove 31 has a first end and a second end. When the lock member 11 is driven to extend into the restraining groove 31 by the driving assembly 12, the rotation angle of the carrier body 2 is restrained within an angle included between the first end and the second end of the restraining groove 31. When the carrier body 2 rotates with respect to the installation bracket 3, the lock member 11 interferes with the restraining groove 31. The rotation angle of the carrier body 2 with respect to the installation bracket 3 is restrained by the interference of the lock member 11 within the restraining groove 31. Accordingly, under the cooperation between the lock member 11 and the restraining groove 31, the carrier body 2 can only rotate with respect to the installation bracket 3 within a specific rotation range (i.e. smaller than 360 degrees), so as to prevent a user from incorrectly adjusting the angle of the carrier body 2 with respect to the installation bracket 3. Accordingly, the invention can achieve the purpose of protecting the safety of children and then satisfy the use requirement for younger children. On the other hand, the driving assembly 12 drives the lock member 11 to eject from the restraining groove 31 through the extension hole 131 to allow the carrier body 2 to randomly adjust the rotation angle with respect to the installation bracket 3. That is to say, the carrier body 2 can randomly rotate with respect to the installation bracket 3 by 360 degrees to adjust the relative angle therebetween, so as to satisfy the use requirement for older children. The misuse preventing mechanism 1 may be applied to a baby seat, a high chair, a rotatable child safety seat, or other seats. A rotatable child safety seat 100 will be exemplified in the following for purpose of illustration. When the misuse preventing mechanism 1 is applied to the rotatable child safety seat 100, the rotatable child safety seat 100 includes a carrier body 2, a base 13, an installation bracket 3, and the aforesaid misuse preventing mechanism 1. The base 13 is installed on a bottom of the carrier body 2. The installation bracket 3 supports the carrier body 2 and can rotate with respect to the base 13, such that the carrier body 2 can rotate with respect to the installation bracket 3. The misuse preventing mechanism 1 is disposed between the carrier body 2 and installation bracket 3. The misuse preventing mechanism 1 is used to adjust a rotation range of the carrier body 2 with respect to the installation bracket 3. In this embodiment, the misuse preventing mechanism 1 has a lock mode and an unlock mode. The radian of the restraining groove 31 is larger than 180 degrees and smaller than 270 degrees. The restraining groove 31 is located behind the installation bracket 3. When the misuse preventing mechanism 1 is in the lock mode, the driving assembly 12 drives the lock member 11 to extend into the restraining groove 31. When the carrier body 2 rotates with respect to the installation bracket 3, the lock member 11 interferes with the restraining groove 31. The rotation angle of the carrier body 2 with respect to the installation bracket 3 is restrained by the interference of the lock member 11 within the restraining groove 31. Accordingly, under the cooperation between the lock member 11 and the restraining groove 31, the carrier body 2 can only rotate with respect to the installation bracket 3 within a rotation range larger than 180 degrees and smaller than 270 degrees. That is to say, the angle of the carrier body 2 with respect to the installation bracket 3 can only be adjusted backward, so as to satisfy the use requirement for younger children. When the misuse preventing mechanism 1 is in the unlock mode, the driving assembly 12 drives the lock member 11 to eject from the restraining groove 31 to allow the carrier body 2 to randomly adjust the rotation angle with respect to the installation bracket 3. That is to say, the carrier body 2 can randomly rotate with respect to the installation bracket 3 by 360 degrees to adjust the relative angle therebetween, so as to satisfy the use requirement for older children. More specifically, the invention is described in the following.

Referring to FIGS. 4 to 7, the driving assembly 12 includes an operating member 121, a linkage member 122, and a guiding pillar 123. The lock member 11 is formed as a strip structure. An end of the linkage member 122 is pivotally connected to the operating member 121, wherein a pivot joint between the linkage member 122 and the operating member 121 is the pivot joint a shown in FIGS. 4 to 7. Another end of the linkage member 122 is pivotally connected to the lock member 11, wherein a pivot joint between the linkage member 122 and the lock member 11 is the pivot joint b shown in FIGS. 4 to 7. A side of the lock member 11 has a first guiding hole 111 close to the linkage member 122. The first guiding hole 111 is a longitudinal hole. The first guiding hole 111 is arranged along the length direction of the lock member 11. A middle portion of the linkage member 122 has a second guiding hole 1221. The second guiding hole 1221 is an arc hole and a center of the arc hole corresponds to the pivot joint a between the linkage member 122 and the operating member 121. The guiding pillar 123 is fixed on the base 13 and the guiding pillar 123 is inserted into the first guiding hole 111 and the second guiding hole 1221. The lock member 11 moves along the length direction thereof by means of the guiding cooperation between the first guiding hole 111 of the lock member 11 and the guiding pillar 123, such that the lock member extends into or ejects from the restraining groove 31. The linkage member 122 swings by means of the guiding cooperation between the second guiding hole 1221 of the linkage member 122 and the guiding pillar 123. The operating member 121 is operated to cause the linkage member 122 to swing under guidance of the guiding pillar 123 and drive the lock member 11 to extend into or eject from the restraining groove 31 under guidance of the guiding pillar 123, so as to achieve lock or unlock function. Preferably, the linkage member 122 may be, but not limited to, a diamond-shaped plate.

Referring to FIGS. 4 to 7, the operating member 121 is disposed on an outer surface of the base 13. The linkage member 122 and the lock member 11 are disposed in the base 13. The base 13 has a third guiding hole 132. The linkage member 122 is pivotally connected to the operating member 121 through the third guiding hole 132. The pivot joint a between the linkage member 122 and the operating member 121 slides along the third guiding hole 132. The linkage member 122 swings by means of the guiding cooperation between the guiding pillar 123 and the second guiding hole 1221 of the linkage member 122, so as to drive the lock member 11 to move. Preferably, the third guiding hole 132 is an arc hole and a center of the arc hole corresponds to the guiding pillar 123. The operating member 121 is a knob. The misuse preventing mechanism 1 may be switched to the lock mode or the unlock mode by rotating the knob. Different color marks may be disposed at opposite sides of the knob to indicate different modes. For example, a red mark may be disposed at the left side of the knob to indicate the lock mode. When the knob is switched to the red mark, the misuse preventing mechanism 1 is switched to the lock mode. A green mark may be disposed at the right side of the knob to indicate the unlock mode. When the knob is switched to the green mark, the misuse preventing mechanism 1 is switched to the unlock mode.

Referring to FIGS. 4 to 7, the misuse preventing mechanism 1 further includes an elastic member (not shown). The elastic member is disposed in the misuse preventing mechanism 1. The elastic member provides an elastic force for extending the lock member 11 into the restraining groove 31. Alternatively, in another embodiment, the elastic member provides an elastic force for ejecting the lock member 11 from the restraining groove 31. The arrangement of the elastic member is to ensure the misuse preventing mechanism 1 being switched to one of the lock mode and the unlock mode. In other words, the elastic member can prevent the operating member 121 from being stuck between the lock mode and the unlock mode resulting in the misuse preventing mechanism 1 being unable to be correctly switched to one of the lock mode and the unlock mode.

The operation of the rotatable child safety seat 100 of the invention will be described with reference to FIGS. 1 to 7 in the following.

Figure 6:
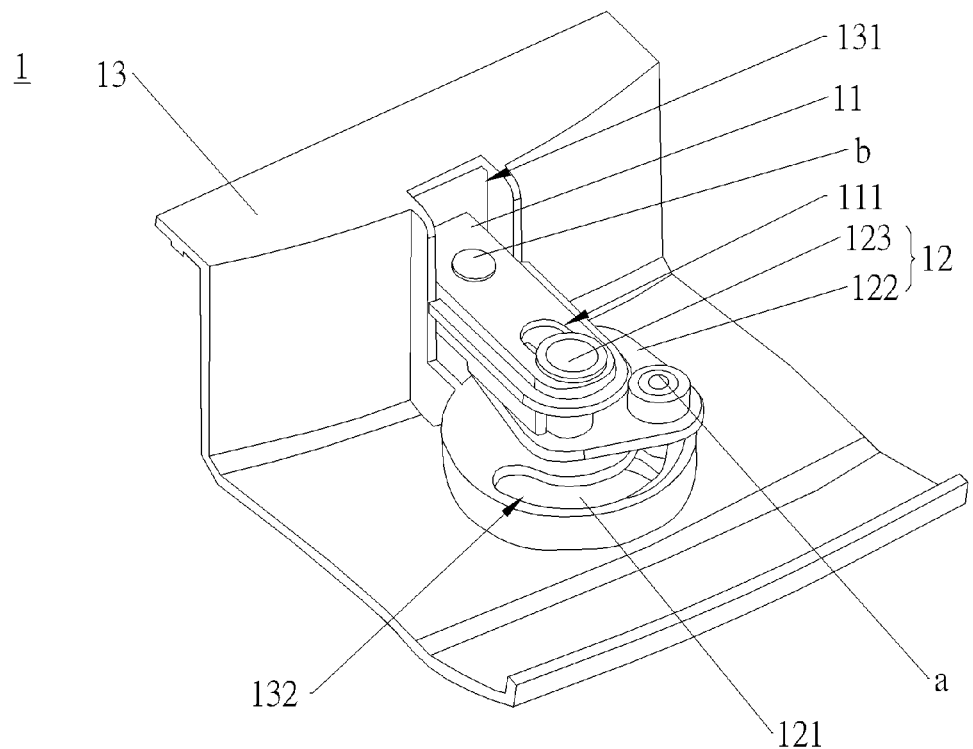
FIG. 6 is a schematic view illustrating the structure of a misuse preventing mechanism of the invention in a lock mode.
Figure 7:
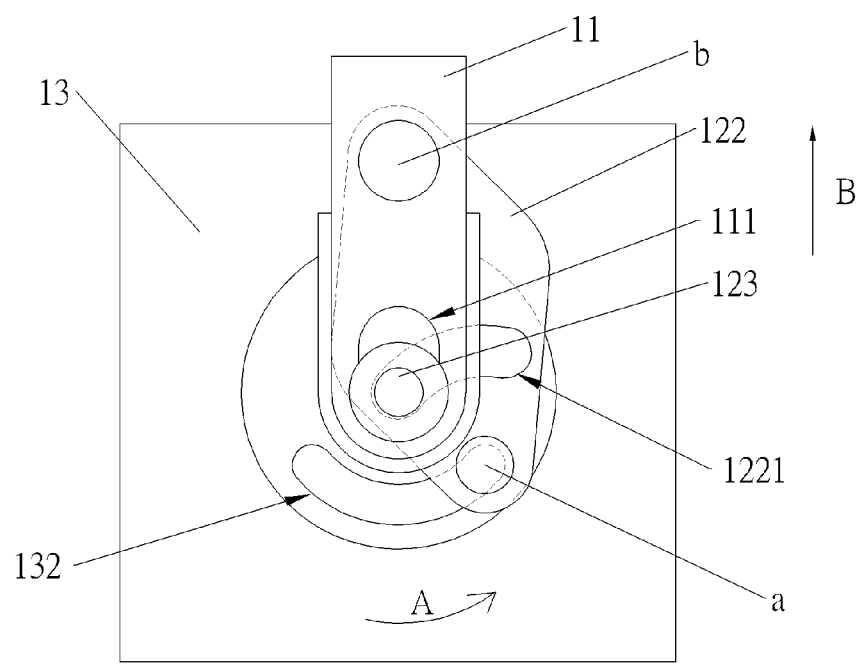
FIG. 7 is a top view illustrating the misuse preventing mechanism shown in FIG. 6.

When the carrier body 2 needs to be restrained to backward use, the operating member is switched to the lock member by rotating the operating member 121. The rotation of the operating member 121 drives the pivot joint a between the operating member 121 and the linkage member 122 to rotate to a side of the third guiding hole 132 (the rotation direction is indicated by an arrow A shown in FIG. 7 and the state after rotation is shown in FIGS. 6 and 7). The linkage member 122 swings by means of the guiding cooperation between the second guiding hole 1221 of the linkage member 122 and the guiding pillar 123. Since an end of the linkage member 122 is pivotally connected to the lock member 11, the linkage member 122 swings to make the lock member 11 move toward the restraining groove 31 under guidance of the guiding pillar 123 (the moving direction is indicated by an arrow B shown in FIG. 7) and then extend into the restraining groove 31, so as to achieve lock function. Accordingly, under the cooperation between the lock member 11 and the restraining groove 31, the carrier body 2 can only rotate with respect to the installation bracket 3 within a rotation range larger than 180 degrees and smaller than 270 degrees. That is to say, the angle of the carrier body 2 with respect to the installation bracket 3 can only be adjusted backward.

Figure 4:
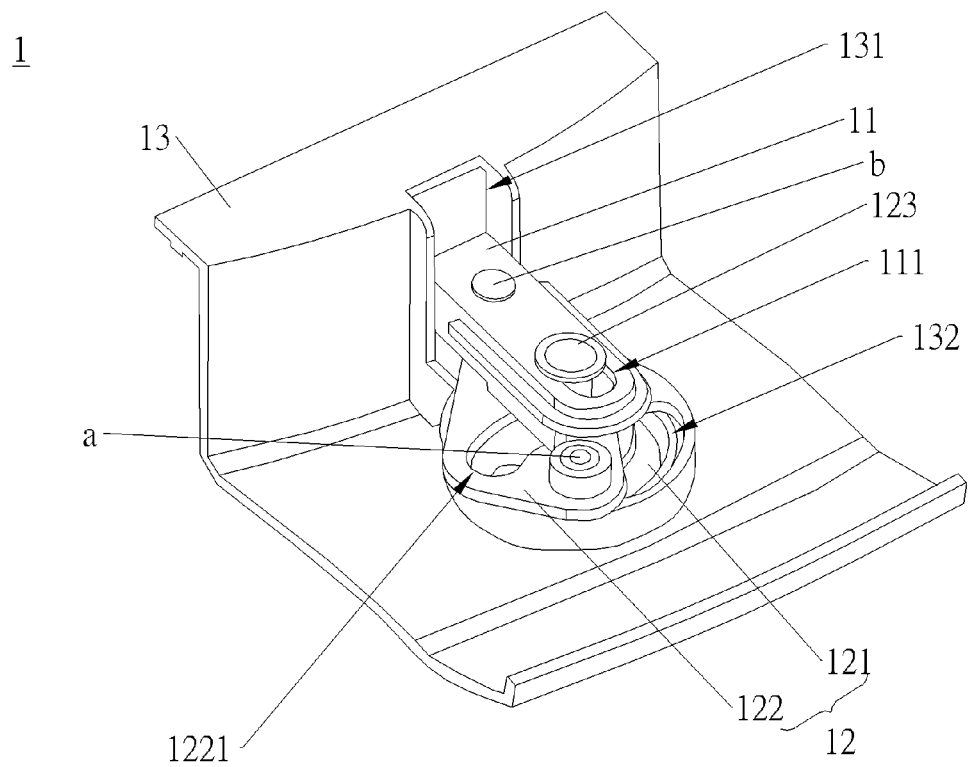
FIG. 4 is a schematic view illustrating the structure of a misuse preventing mechanism of the invention in an unlock mode.
Figure 5:
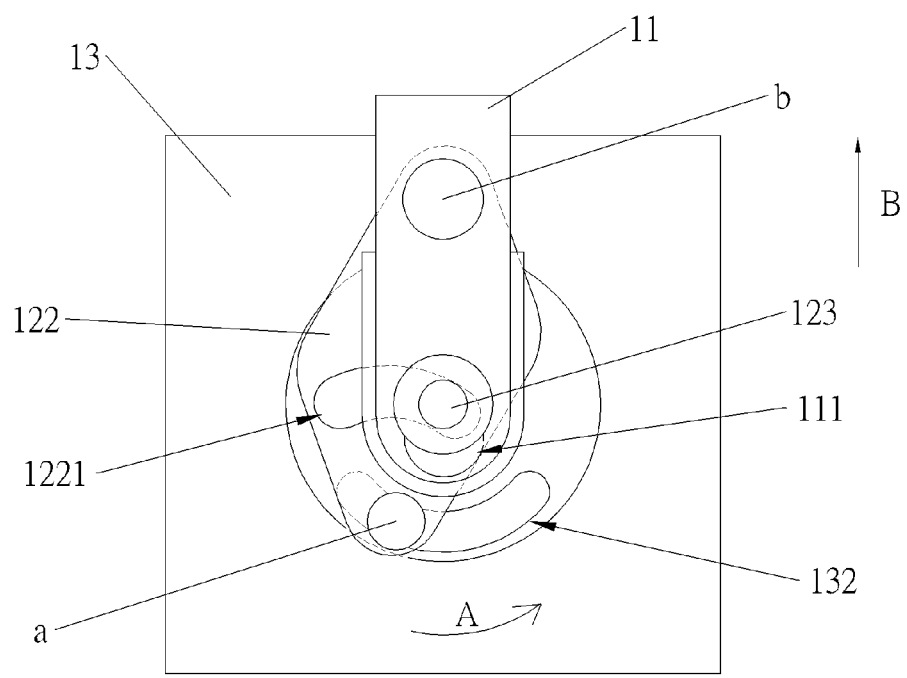
FIG. 5 is a top view illustrating the misuse preventing mechanism shown in FIG. 4.

When the carrier body 2 needs to freely rotate with respect to the installation bracket 3, the operating member is switched to the unlock member by rotating the operating member 121. The rotation of the operating member 121 drives the pivot joint a between the operating member 121 and the linkage member 122 to rotate to the middle portion of the third guiding hole 132 (the rotation direction is opposite to a direction indicated by an arrow A shown in FIG. 5 and the state after rotation is shown in FIGS. 4 and 5). The linkage member 122 swings by means of the guiding cooperation between the guiding pillar 123 and the second guiding hole 1221 of the linkage member 122. Since an end of the linkage member 122 is pivotally connected to the lock member 11, the linkage member 122 swings to make the lock member 11 move away from the restraining groove 31 under guidance of the guiding pillar 123 (the moving direction is opposite to a direction indicated by an arrow B shown in FIG. 5) and then eject from the restraining groove 31, so as to achieve unlock function to allow the carrier body 2 to freely rotate with respect to the installation bracket 3 by 360 degrees. That is to say, the carrier body 2 can randomly adjust the rotation angle with respect to the installation bracket 3.

As mentioned in the above, the misuse preventing mechanism 1 of the invention is equipped with the lock member 11 and the driving assembly 12 and the restraining groove 31 is correspondingly formed on the installation bracket 3 for restraining the rotation angle of the carrier body 2. The driving assembly 12 can drive the lock member 11 to extend into the restraining groove 31, such that the rotation angle of the carrier body 2 with respect to the installation bracket 3 is restrained by the interference of the lock member 11 within the restraining groove 31. Accordingly, under the cooperation between the lock member 11 and the restraining groove 31, the carrier body 2 can only rotate with respect to the installation bracket 3 within a specific rotation range, so as to prevent a user from incorrectly adjusting the angle of the carrier body 2 with respect to the installation bracket 3. Accordingly, the invention can achieve the purpose of protecting the safety of children and then satisfy the use requirement for younger children. On the other hand, the driving assembly 12 can drive the lock member 11 to eject from the restraining groove 31 to allow the carrier body 2 to randomly adjust the rotation angle with respect to the installation bracket 3, so as to satisfy the use requirement for older children. The misuse preventing mechanism 1 of the invention has the advantages of safety and simple structure.

The invention claimed is:

1. A misuse preventing mechanism disposed on a rotatable child safety seat, the rotatable child safety seat having a base and an installation bracket coupled to the base and configured to support a carrier body, the installation bracket being capable of rotating with respect to the base and having a restraining groove, and the misuse preventing mechanism comprising a lock member disposed on the base and driven to extend into the restraining groove to restrain a rotation angle of the carrier body,
wherein the misuse preventing mechanism further comprises a driving assembly disposed on the base, the driving assembly being adapted to drive the lock member to extend into the restraining groove, and drive the lock member to eject from the restraining groove; and
wherein the driving assembly comprises an operating member, a linkage member, and a guiding pillar, the operating member is pivotally connected to the linkage member, a pivot joint between the operating member and the linkage member slides along an arc hole about the guiding pillar, such that rotation of the operating member drives the lock member to move along a length direction of the lock member.

2. The misuse preventing mechanism of claim 1, wherein the restraining groove has a first end and a second end; and when the lock member is driven to extend into the restraining groove, the rotation angle of the carrier body is restrained within an angle included between the first end and the second end of the restraining groove.

3. The misuse preventing mechanism of claim 1, wherein an end of the linkage member is pivotally connected to the operating member, another end of the linkage member is pivotally connected to the lock member, the lock member has a first guiding hole, a middle portion of the linkage member has a second guiding hole, the guiding pillar is fixed on the base, the guiding pillar is inserted into the first guiding hole and the second guiding hole, and the operating member is operated to cause the linkage member to swing under guidance of the guiding pillar and drive the lock member to extend into or eject from the restraining groove under guidance of the guiding pillar.

4. The misuse preventing mechanism of claim 3, wherein the operating member is disposed on an outer surface of the base, the linkage member and the lock member are disposed in the base, the base has the arc hole, and the linkage member is pivotally connected to the operating member through a third guiding hole.

5. The misuse preventing mechanism of claim 4, wherein a center of the arc hole corresponds to the guiding pillar.

6. The misuse preventing mechanism of claim 4, wherein the operating member is a knob.

7. The misuse preventing mechanism of claim 3, wherein the first guiding hole is a longitudinal hole.

8. The misuse preventing mechanism of claim 3, wherein the second guiding hole is an arc hole and a center of the arc hole corresponds to a pivot joint between the linkage member and the operating member.

9. The misuse preventing mechanism of claim 3, wherein the base has an extension hole and the lock member extends into or ejects from the restraining groove through the extension hole.

10. The misuse preventing mechanism of claim 1, wherein the misuse preventing mechanism further comprises an elastic member and the elastic member provides an elastic force for extending the lock member into the restraining groove.

11. The misuse preventing mechanism of claim 1, wherein the misuse preventing mechanism further comprises an elastic member and the elastic member provides an elastic force for ejecting the lock member from the restraining groove.

12. A rotatable child safety seat comprising a carrier body, a base, and an installation bracket capable of supporting the carrier body and rotating with respect to the base, the rotatable child safety seat further comprising the misuse preventing mechanism of claim 1, the misuse preventing mechanism being disposed between the carrier body and the installation bracket, and a rotation range of the carrier body with respect to the installation bracket being adjusted by the misuse preventing mechanism.

* * * * *